L. J. HILLENBRAND.
CLINICAL THERMOMETER.
APPLICATION FILED DEC. 4, 1915.

1,321,743.

Patented Nov. 11, 1919.

Inventor
Louis J. Hillenbrand

Witnesses
Hugh H. Ott

By Victor J. Evans
Attorney

UNITED STATES PATENT OFFICE.

LOUIS J. HILLENBRAND, OF RUTHERFORD, NEW JERSEY.

CLINICAL THERMOMETER.

1,321,743.  Specification of Letters Patent.  Patented Nov. 11, 1919.

Application filed December 4, 1915. Serial No. 65,090.

*To all whom it may concern:*

Be it known that I, LOUIS J. HILLENBRAND, a citizen of the United States, residing at Rutherford, in the county of Bergen and State of New Jersey, have invented new and useful Improvements in Clinical Thermometers, of which the following is a specification.

This invention relates to improvements in clinical thermometers, and particularly to improvements in this class of thermometers whereby the reading of the thermometer is facilitated, and the crevices on the surface of the thermometer reduced so as to correspondingly eliminate dangers of infection.

Clinical thermometers of ordinary construction are provided with a very restricted bore for the thread-like passage of the mercury throughout its column, making it difficult for even skilled persons to obtain an accurate reading of the thermometer, particularly in a bad light, so that mistakes in the reading of the thermometer are liable to be made. For the purpose of rendering the reading easier, it has been the general practice to provide such thermometers with a "magnifier," but even with this assistance, mistakes are liable to be made. Furthermore, it is common in this class of thermometers to etch the scale lines and figures and to place in the etched recesses a black or other colored compound to render the lines and figures more clearly perceptible. This compound is dislodged in course of time, leaving spaces or recesses in which germs may collect and cause infection.

One object of the invention is to provide a thermometer of the character described in which all the surface of the thermometer, at least along the reading portions, with the exception of the magnifying portion and the scale, is dull or opaque, thus producing in a simple and effective manner a surface which by contrast allows the mercury to be readily seen and its position in the column determined with facility and certainty.

A further object of the invention is to provide a thermometer in which the elements of the reading scale are formed by simply etching away or omitting portions of the dull or opaque surface, thus leaving no crevices in which germs may lodge.

The invention consists of the details hereinafter fully described and claimed, reference being had to the accompanying drawing in which:—

Figure 1:
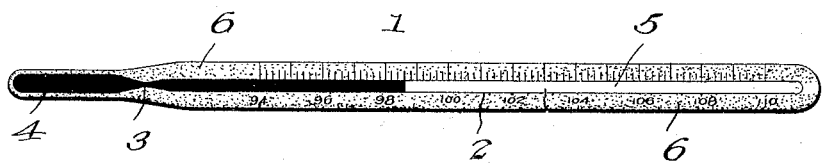
Figure 1 is a plan view of a clinical thermometer embodying my invention.
Figure 2:
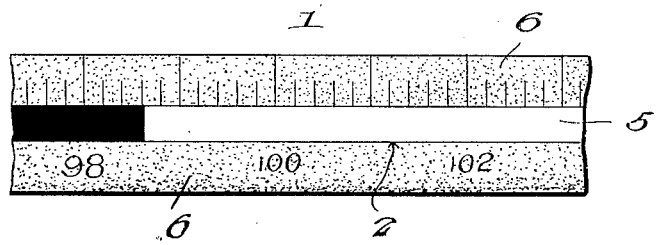
Fig. 2 is a view of a portion thereof on a greatly enlarged scale.

The thermometer may be, in general, of any of the constructions in common use, the same comprising a stem 1 of glass having a mercury bore or passage 2, and a constricted portion 3 communicating with the mercury bulb 4 and also having the magnifier or magnifying portion 5 of clear glass above or beyond the normal temperature indicating point.

The thermometer is provided with the usual scale 6, which may have a range of from 94° to 110° F., the scale being marked off or arranged in any suitable manner to accentuate the normal temperature indicating point, as well as to distinguish the subnormal and super-normal portions of the scale.

In accordance with my invention, I provide the face of the stem 1 with a frosted surface 7, which may cover the entire body of the thermometer, with the exception of a stripe constituting the magnifying portion 5, it being sufficient for all ordinary purposes to confine the frosted surface to points along the line of the mercury column, on both sides thereof, with the exception of the magnifying portion as stated, so that by contrast the thread of mercury may be readily distinguished and its position along the column with reference to the graduations of the scale determined in an easy and instantaneous manner. This frosted surface may be formed in any desired manner though I prefer to use hydrofluoric acid to form said surface.

In accordance with my invention the lines of the scale and figures or other indicia are made by etching them with a weak solution of acid, which is just sufficient in strength to remove the frosted surface at the particular points, thus producing scale lines and figures which are clear rather than frosted. These are of a permanent character and made without the necessity of employing pits or recesses in which germs may lodge, with the consequent danger of transmitting by infection diseases from one person to another. This frosted surface is the same as that produced on an all-glass hypodermic syringe which, as is well known, is the most sanitary syringe on the market.

I claim:—

A clinical thermometer made wholly of one piece of glass and provided with a magnifier above the mercury bore and having its surface on each side of said magnifier frosted by thinly etching said surface by hydrofluoric acid, and scale lines and figures formed on said frosted surface by etching away portions of the frosted part by a weak solution of an acid such as hydrofluoric acid to make such portions relatively clear with respect to the frosted surfaces.

In testimony whereof I affix my signature in presence of two witnesses.

LOUIS J. HILLENBRAND.

Witnesses:
 E. DANA CAULKINS,
 JOHN D. SCULLY.

Copies of this patent may be obtained for five cents each, by addressing the "Commissioner of Patents, Washington, D. C."